United States Patent
Morita

(10) Patent No.: US 11,956,404 B2
(45) Date of Patent: Apr. 9, 2024

(54) AUTHENTICATION DEVICE AND IMAGE FORMING APPARATUS

(71) Applicant: KYOCERA Document Solutions Inc., Osaka (JP)

(72) Inventor: Yoshio Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 679 days.

(21) Appl. No.: 16/972,571

(22) PCT Filed: May 23, 2019

(86) PCT No.: PCT/JP2019/020412
§ 371 (c)(1),
(2) Date: Dec. 4, 2020

(87) PCT Pub. No.: WO2019/239834
PCT Pub. Date: Dec. 19, 2019

(65) Prior Publication Data
US 2021/0250467 A1    Aug. 12, 2021

(30) Foreign Application Priority Data
Jun. 14, 2018  (JP) ................................. 2018-113775

(51) Int. Cl.
*H04N 1/44* (2006.01)
*G06F 21/31* (2013.01)
*G06F 21/45* (2013.01)

(52) U.S. Cl.
CPC .......... *H04N 1/4413* (2013.01); *G06F 21/31* (2013.01); *G06F 21/45* (2013.01); *H04N 1/4433* (2013.01)

(58) Field of Classification Search
CPC .. H04N 1/4413; H04N 1/4433; H04N 1/4406; G06F 21/31; G06F 21/45; G06F 21/608; B41J 29/38
See application file for complete search history.

(56) References Cited

U.S. PATENT DOCUMENTS 5,533,125 A * 7/1996 Bensimon ............... G06F 21/31
713/193
5,963,340 A * 10/1999 Kim ...................... H04N 1/4413
358/404

(Continued)

FOREIGN PATENT DOCUMENTS

JP    2001-117661 A    4/2001
JP    2002-312319 A    10/2002

(Continued)

*Primary Examiner* — Aravind K Moorthy
(74) *Attorney, Agent, or Firm* — IP Business Solutions, LLC

(57) ABSTRACT

In an authentication device, a controller executes login when a user name and a password are entered through an operation device and the entered password is identical to one of a plurality of fixed passwords previously stored in association with the entered user name on an HDD. When the entered password is identical to none of the plurality of fixed passwords and any one of the plurality of fixed passwords satisfies a predetermined condition on similarity to the entered password, the controller inhibits an authentication based on the fixed password satisfying the predetermined condition from being made for a predetermined period.

3 Claims, 10 Drawing Sheets

(56) References Cited

U.S. PATENT DOCUMENTS

| | | | | |
|---|---|---|---|---|
| 6,745,334 B1* | 6/2004 | Ikegami | H04N 1/4433 | 726/19 |
| 7,743,241 B1* | 6/2010 | Moore | G06F 21/6209 | 713/161 |
| 8,245,026 B1* | 8/2012 | Moore | G06F 21/6209 | 713/1 |
| 8,312,540 B1* | 11/2012 | Kahn | G06F 21/552 | 726/25 |
| 8,341,716 B2* | 12/2012 | Sakayama | G06F 21/33 | 726/19 |
| 8,639,873 B1* | 1/2014 | Jevans | G06F 12/0804 | 711/135 |
| 9,148,408 B1* | 9/2015 | Glazemakers | H04L 63/20 | |
| 9,258,118 B1* | 2/2016 | Roth | H04L 9/0872 | |
| 9,355,233 B1* | 5/2016 | Chen | H04L 9/0891 | |
| 9,374,368 B1* | 6/2016 | Roth | H04L 63/123 | |
| 9,413,752 B2* | 8/2016 | Lu | G06F 21/31 | |
| 9,461,820 B1* | 10/2016 | Dall | H04L 63/061 | |
| 9,600,643 B2* | 3/2017 | Strode | G06F 21/31 | |
| 9,722,996 B1* | 8/2017 | Kolman | H04L 63/083 | |
| 10,268,814 B1* | 4/2019 | Barnes | G06F 3/0482 | |
| 2002/0135816 A1* | 9/2002 | Ohwa | H04N 1/444 | 358/474 |
| 2004/0025031 A1* | 2/2004 | Ooi | G06F 21/32 | 713/186 |
| 2004/0139355 A1* | 7/2004 | Axel | H04L 63/0815 | 726/4 |
| 2004/0243626 A1* | 12/2004 | Wyle | G06Q 40/123 | |
| 2005/0049899 A1* | 3/2005 | Lu | G06Q 10/02 | 705/5 |
| 2005/0081064 A1* | 4/2005 | Ooi | G06F 21/10 | 726/19 |
| 2006/0041756 A1* | 2/2006 | Ashok | G06F 21/31 | 726/26 |
| 2006/0059434 A1* | 3/2006 | Boss | G06F 21/46 | 715/780 |
| 2006/0075256 A1* | 4/2006 | Hagiwara | G06F 21/32 | 713/186 |
| 2006/0085649 A1* | 4/2006 | Wong | G06F 21/31 | 713/183 |
| 2006/0143705 A1* | 6/2006 | Sentoff | G06F 21/41 | 726/19 |
| 2007/0039042 A1* | 2/2007 | Apelbaum | H04L 9/14 | 726/6 |
| 2007/0143627 A1* | 6/2007 | Hsieh | G06F 21/83 | 713/183 |
| 2007/0226486 A1* | 9/2007 | Chen | H04L 63/0428 | 713/153 |
| 2008/0066167 A1* | 3/2008 | Andri | G06F 21/31 | 726/5 |
| 2008/0320588 A1* | 12/2008 | Lipetz | G06F 21/6218 | 726/19 |
| 2009/0157588 A1* | 6/2009 | Jivsov | G06N 7/00 | 706/48 |
| 2009/0193518 A1* | 7/2009 | Craine | G06F 21/31 | 726/18 |
| 2009/0249450 A1* | 10/2009 | DeJana | G06F 21/629 | 726/5 |
| 2009/0249456 A1* | 10/2009 | Malas | H04L 63/107 | 455/456.1 |
| 2010/0031349 A1* | 2/2010 | Bingham | G06F 21/31 | 726/20 |
| 2010/0060743 A1* | 3/2010 | Sato | H04N 1/4413 | 713/193 |
| 2010/0100968 A1* | 4/2010 | Urasawa | H04L 63/102 | 726/28 |
| 2010/0115201 A1* | 5/2010 | Hsu | G06F 21/85 | 711/E12.001 |
| 2010/0122331 A1* | 5/2010 | Wang | G06F 21/31 | 726/6 |
| 2010/0180335 A1* | 7/2010 | Smithson | G06F 21/31 | 726/18 |
| 2011/0150221 A1* | 6/2011 | Kitada | H04L 63/0815 | 380/255 |
| 2012/0060213 A1* | 3/2012 | Childress | G06F 21/31 | 726/18 |
| 2012/0159041 A1* | 6/2012 | Saxena | G06F 21/78 | 711/163 |
| 2012/0229844 A1* | 9/2012 | Yada | G06F 3/1204 | 358/1.15 |
| 2012/0254270 A1* | 10/2012 | Ishidoshiro | H04L 67/1097 | 707/827 |
| 2012/0260023 A1 | 10/2012 | Nagai et al. | | |
| 2012/0304302 A1* | 11/2012 | Stecher | G06F 21/31 | 726/26 |
| 2012/0331534 A1* | 12/2012 | Smith | H04L 9/0891 | 726/6 |
| 2013/0037608 A1* | 2/2013 | Evevsky | G06F 21/31 | 235/380 |
| 2013/0061319 A1* | 3/2013 | Yasuhara | H04N 1/4433 | 726/19 |
| 2013/0072160 A1* | 3/2013 | Lawson | G06F 21/105 | 455/411 |
| 2013/0091559 A1* | 4/2013 | Thun | G06F 21/43 | 726/5 |
| 2013/0103939 A1* | 4/2013 | Radpour | H04W 12/50 | 713/152 |
| 2013/0160112 A1* | 6/2013 | Sato | G06F 21/31 | 726/19 |
| 2013/0254856 A1* | 9/2013 | Krishan | H04L 63/083 | 726/6 |
| 2014/0007208 A1* | 1/2014 | Faludi | G06F 21/31 | 726/7 |
| 2014/0090028 A1* | 3/2014 | Matsugashita | G06F 21/41 | 726/4 |
| 2014/0137216 A1* | 5/2014 | Mohler | G06F 21/45 | 726/5 |
| 2014/0259153 A1* | 9/2014 | Le | G06F 21/31 | 726/19 |
| 2014/0337937 A1* | 11/2014 | Truskovsky | G06F 21/554 | 726/5 |
| 2014/0337941 A1* | 11/2014 | Kominar | G06F 21/45 | 726/6 |
| 2015/0143510 A1* | 5/2015 | Hanthorn | G06F 21/62 | 726/19 |
| 2015/0150108 A1* | 5/2015 | Asai | H04L 63/08 | 726/8 |
| 2015/0163219 A1* | 6/2015 | Lo | H04L 63/0861 | 726/7 |
| 2015/0200781 A1* | 7/2015 | Tu | H04L 63/083 | 713/155 |
| 2015/0249766 A1* | 9/2015 | Asahara | H04N 1/4406 | 358/1.14 |
| 2015/0278509 A1* | 10/2015 | Arning | G06F 21/46 | 726/6 |
| 2015/0309946 A1 | 10/2015 | Nagai et al. | | |
| 2015/0317469 A1* | 11/2015 | Liu | G06F 21/36 | 726/19 |
| 2015/0371027 A1* | 12/2015 | Kitajima | G06F 21/35 | 711/103 |
| 2015/0381838 A1* | 12/2015 | Hikosaka | H04N 1/00363 | 358/1.14 |
| 2016/0072756 A1* | 3/2016 | Aravkin | H04L 51/02 | 709/206 |
| 2016/0098232 A1* | 4/2016 | Sato | H04N 1/00204 | 358/1.14 |
| 2016/0099917 A1* | 4/2016 | Glazemakers | H04L 63/0272 | 726/12 |
| 2016/0113047 A1* | 4/2016 | Chen | H04W 76/18 | 370/329 |
| 2016/0149895 A1* | 5/2016 | Takai | G06F 21/45 | 726/7 |
| 2016/0182761 A1* | 6/2016 | Tobinaga | H04N 1/0032 | 358/1.14 |
| 2016/0191475 A1* | 6/2016 | Lee | G06F 21/6218 | 726/19 |
| 2016/0283744 A1* | 9/2016 | Dawson | G06F 16/22 | |
| 2016/0292413 A1* | 10/2016 | Williams | G06F 21/31 | |

(56) References Cited

U.S. PATENT DOCUMENTS

| | | | |
|---|---|---|---|
| 2016/0294804 A1* | 10/2016 | Yamahara | H04L 63/102 |
| 2016/0300048 A1* | 10/2016 | Mason | G06F 21/31 |
| 2016/0342800 A1* | 11/2016 | Ma | G06F 21/62 |
| 2016/0357981 A1* | 12/2016 | Tzeng | G06F 21/629 |
| 2017/0006084 A1* | 1/2017 | Hato | H04L 67/1095 |
| 2017/0132115 A1* | 5/2017 | Misra | G06F 40/289 |
| 2017/0185806 A1* | 6/2017 | Kong | G06F 21/45 |
| 2017/0230372 A1* | 8/2017 | Weinstein | H04L 63/1408 |
| 2017/0277872 A1* | 9/2017 | Mercury | H04L 63/083 |
| 2017/0279788 A1* | 9/2017 | Rosenblum | H04L 63/083 |
| 2017/0302702 A1* | 10/2017 | Hu | G06F 21/554 |
| 2017/0374425 A1* | 12/2017 | Disley | G06Q 10/101 |
| 2018/0004934 A1* | 1/2018 | Venkataramani | H04L 9/0891 |
| 2018/0146369 A1* | 5/2018 | Kennedy, Jr. | H04W 12/04 |
| 2018/0211018 A1* | 7/2018 | Yang | G06F 21/62 |
| 2018/0309744 A1* | 10/2018 | Chou | G06F 21/42 |
| 2019/0018949 A1* | 1/2019 | Xu | G06F 21/31 |
| 2019/0018972 A1* | 1/2019 | Xu | G06F 21/31 |
| 2019/0236313 A1* | 8/2019 | Bush | H04L 63/0823 |

FOREIGN PATENT DOCUMENTS

| | | |
|---|---|---|
| JP | 2009-070031 A | 4/2009 |
| JP | 2009-199603 A | 9/2009 |
| JP | 2012-221257 A | 11/2012 |

\* cited by examiner

AUTHENTICATION DEVICE AND IMAGE FORMING APPARATUS

TECHNICAL FIELD

The present invention relates to authentication devices and image forming apparatuses and particularly relates to a technique for making an authentication using a password.

BACKGROUND ART

A technique is known in which when using a device, a system or the like, an authentication is made using a password.

For example, Patent Literature 1 discloses a system in which a user previously registers a plurality of one-time passwords in a database on a server and, when, at a user's attempt to log in to the server, a password entered by the user is identical to one of the registered one-time passwords, the server permits the user to log in and removes the one-time password corresponding to the entered password from the database.

CITATION LIST

Patent Literature

Patent Literature 1: JP-A-2002-312319

SUMMARY OF INVENTION

In many cases, only one password for use in authentication is registered for each device or system. In registering passwords for devices or systems as described above, the user may set different passwords respectively for different devices or systems for the purpose of ensuring safety and thus have a plurality of passwords by oneself. In such a case, the user may forget which password is registered for which device or system and, thus, there arises a problem of difficulty for the user to be permitted to log in to a device or system to which the user desires to log in.

In the technique disclosed in Patent Literature 1, the user can log in to the server simply by entering a password identical to one of the plurality of one-time passwords previously registered and, therefore, the user is more likely to be permitted to log in to the server as compared to the case where only one password is registered for the server. In addition, since the one-time password once used is thrown away, this prevents a decrease in safety due to an increased likelihood of permission for login. However, the user needs to register many one-time passwords one after another and remember them, which makes it difficult to manage the passwords and is therefore user-inconvenient.

The present invention has been made in view of the above circumstances and, therefore, has an object of making a user more likely to be permitted to log in as compared to the case where only one password is registered, and preventing a decrease in safety due to an increased likelihood of permission for login while ensuring user convenience.

An authentication device according to an aspect of the present invention includes: a storage device that previously stores user information for identifying a user and a plurality of fixed passwords in association between the user information and the plurality of fixed passwords; an input device for use in entering user information and a password; and a controller that executes login when user information and a password are entered through the input device and the entered password is identical to one of the plurality of fixed passwords previously stored in association with the entered user information in the storage device, wherein when the entered password is identical to none of the plurality of fixed passwords previously stored in association with the entered user information in the storage device and any one of the plurality of fixed passwords satisfies a predetermined condition on similarity to the entered password, the controller inhibits an authentication based on the fixed password satisfying the predetermined condition from being made for a predetermined period.

An image forming apparatus according to another aspect of the present invention includes the above-described authentication device and an image forming device that forms an image on a recording medium when the login is executed by the authentication device.

According to the present invention, since the user can log in simply by entering a password identical to one of the plurality of fixed passwords previously registered, the user is more likely to be permitted to log in as compared to the case where only one password is registered, which increases user convenience. Furthermore, when there is a fixed password satisfying the predetermined condition on similarity to the entered password, the making of an authentication based on the fixed password is inhibited. Therefore, a decrease in safety due to an increased likelihood of permission for login can be prevented without using any disposable password, which further increases user convenience.

DESCRIPTION OF EMBODIMENTS

Figure 1:
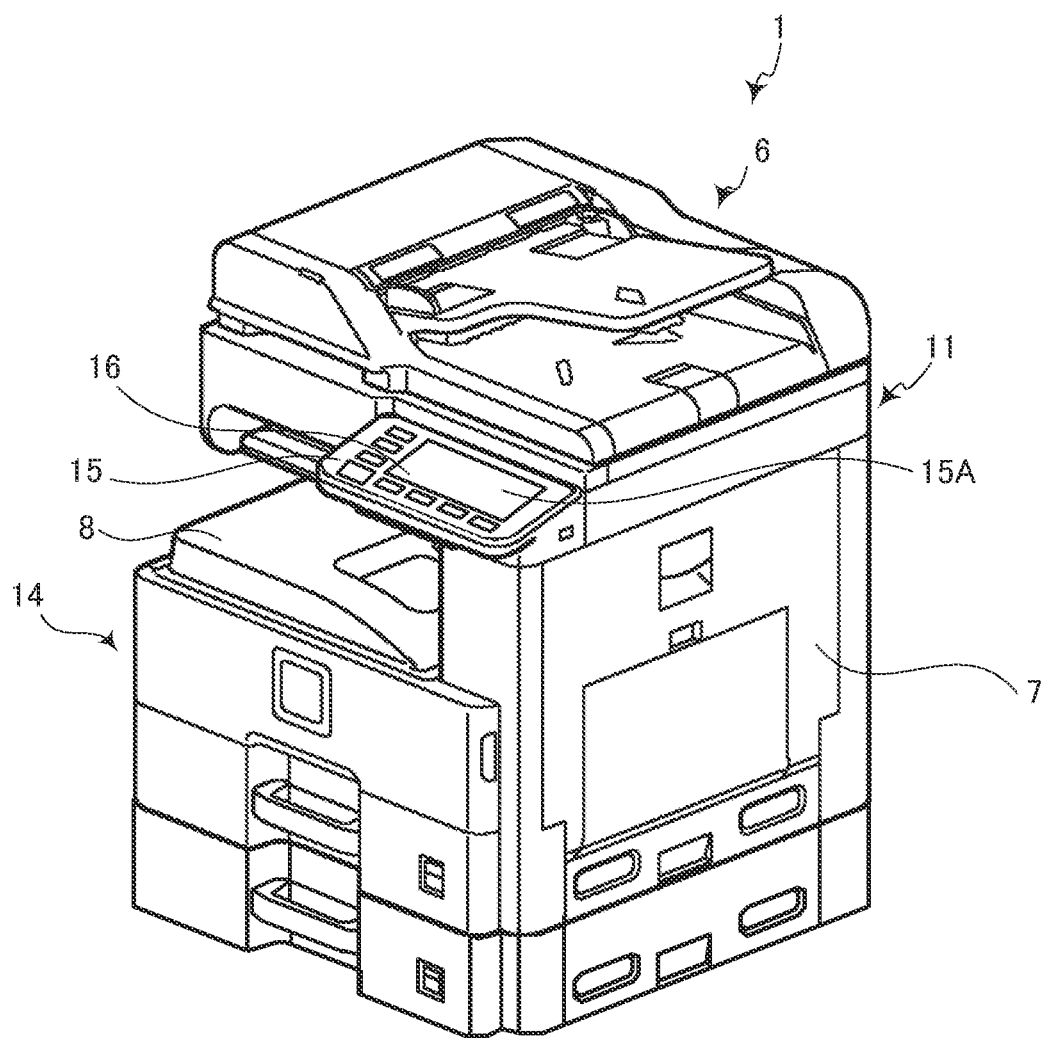
FIG. 1 is a perspective view showing an appearance of an image forming apparatus including an authentication device according to one embodiment of the present invention.

Hereinafter, a description will be given of an authentication device and an image forming apparatus, each according to one embodiment of the present invention, with reference to the drawings. FIG. 1 is a perspective view showing an appearance of an image forming apparatus including an authentication device according to the one embodiment of the present invention.

The image forming apparatus 1 is a multifunction peripheral having multiple functions, including a facsimile function, a copy function, a print function, and a scan function.

Referring to FIG. 1, a housing 7 of the image forming apparatus 1 contains a plurality of devices for implementing various functions of the image forming apparatus 1. For example, the housing 7 contains an image reading device 11, an image forming device 12 (not shown in FIG. 1), a fixing device 13 (not shown in FIG. 1), a sheet feed device 14, and so on.

The image reading device 11 is an ADF (auto document feeder) including: a document feed device 6 capable of feeding an original document; and a scanner that optically reads the original document being fed by the document feed device 6 or an original document placed on an original glass plate. The image reading device 11 irradiates an original document with light from a lighting part and receives light reflected from the original document on a CCD (charge-coupled device) sensor to read an image from the original document and generate image data.

The image forming device 12 includes a photosensitive drum, a charging device, an exposure device, a developing device, and a transfer device. The image forming device 12 forms a toner image on a recording paper sheet fed from the sheet feed device 14, based on the image data generated by the image reading device 11, image data sent from a personal computer or another facsimile device connected thereto via a network or other image a data.

The fixing device 13 applies heat and pressure to the recording paper sheet on the surface of which the toner image is formed by image formation processing of the image forming device 12, thus fixing the toner image on the recording paper sheet. After the fixation of the fixing device 13, the recording paper sheet having an image formed thereon is discharged to a sheet output tray 8.

The sheet feed device 14 pulls out recording paper sheets contained in a sheet cassette or recording paper sheets put on a manual feed tray sheet by sheet by a pick-up roller and feeds forward the pulled-out recording paper sheet to the image forming device 12.

The image forming apparatus 1 includes an operation device 15. A user can input, through the operation device 15, instructions, data or so on on various functions executable by the image forming apparatus 1. The operation device 15 includes a display device 16. The display device 16 is a display device including a liquid crystal display. The display device 16 displays various screens related to the various functions executable by the image forming apparatus 1. The operation device 15 includes a touch panel 15A laid over the display device 16.

Figure 2:
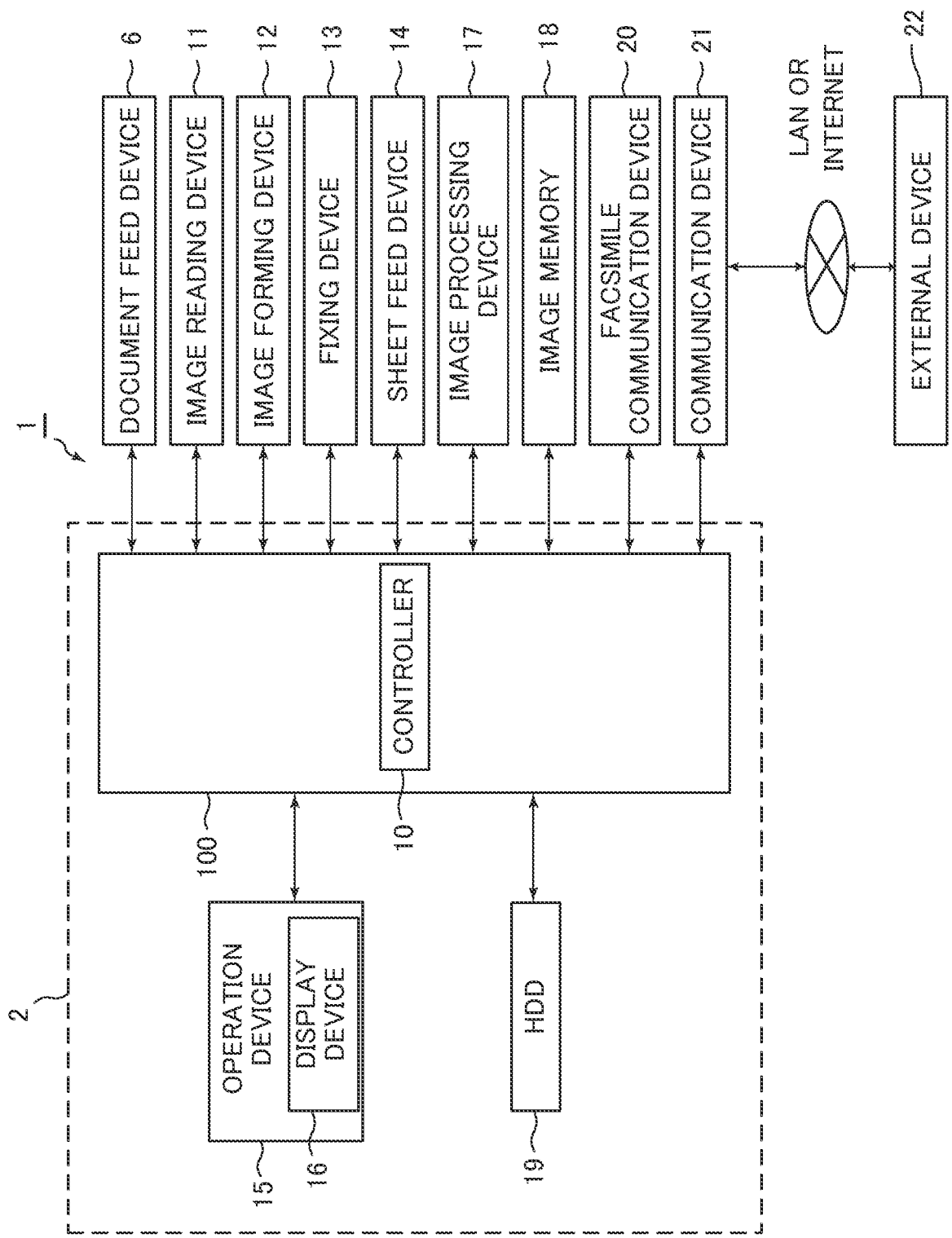
FIG. 2 is a block diagram showing an internal configuration of the image forming apparatus including the authentication device according to the one embodiment of the present invention.

FIG. 2 is a block diagram showing an internal configuration of the image forming apparatus including the authentication device according to the one embodiment of the present invention. Referring to FIG. 2, the image forming apparatus 1 includes a control device 100. The control device 100 includes a processor, a RAM (random access memory), a ROM (read only memory), and so on. The processor is, for example, a CPU (central processing unit), an MPU (micro-processing unit) or an ASIC (application specific integrated circuit). When a control program stored in the built-in ROM or on an HDD (hard disk drive) 19 is executed by the processor described above, the control device 100 functions as a controller 10.

The control device 100 is electrically connected to the document feed device 6, the image reading device 11, the image forming device 12, the fixing device 13, the sheet feed device 14, the operation device 15, an image processing device 17, an image memory 18, the HDD 19, a facsimile communication device 20, a communication device 21, and so on. In this embodiment, the operation device 15, the HDD 19, and the control device 100 function as an authentication device 2 for implementing first authentication processing.

The control device 100 governs the overall control of the image forming apparatus 1. More specifically, the control device 100 performs various types of processing, including the operations of the devices of the image forming apparatus 1 and communications with external devices 22, such as a personal computer, connected via a network.

The image processing device 17 performs, as necessary, image processing of image data generated by the image reading device 11.

The image memory 18 includes a region for temporarily storing image data to be printed generated by the image reading device 11.

The HDD 19 is a large storage device capable of storing various types of data, including image data generated by the image reading device 11. The HDD 19 stores various computer programs for implementing general operations of the image forming apparatus 1.

The HDD 19 stores a control program for executing the first authentication processing according to this embodiment. When the processor operates in accordance with the control program, it executes, as the controller 10, the first authentication processing according to this embodiment. Alternatively, the controller 10 may not be implemented by the operation in accordance with the computer program, but may be configured to be operable by a hardware circuit.

The HDD 19 previously stores, as authentication information, a user name for identifying a user and a plurality of fixed passwords in association between the user name and the plurality of fixed passwords. The user previously registers the authentication information by entering it through the operation device 15. The fixed password is a password for use in permitting the use of predetermined functions of the image forming apparatus 1. The fixed password consists of a fixed character string set by the user. The character string contains characters, numbers or the like. The fixed password is a password that is not disposable but can be used continuously.

When a user name and a password are entered through the operation device 15 by the user and the entered password is identical to one of the plurality of fixed password previously stored in association with the same user name as the entered user name (hereinafter, referred to simply as the "entered user name") on the HDD 19, the controller 10 authenticates user's login to the image forming apparatus 1 and enables the predetermined functions to be executed.

In this embodiment, the above-mentioned predetermined functions include a facsimile function, a copy function, and a print function which are functions for use when the image forming device 12 performs image formation.

Furthermore, when the entered password is identical to none of the plurality of fixed passwords previously stored in association with the entered user name on the HDD 19 and any one of the plurality of fixed passwords satisfies a predetermined condition on similarity to the entered password, the controller 10 inhibits an authentication based on the fixed password satisfying the condition from being made for a predetermined period. Hereinafter, the above-mentioned predetermined condition is referred to as an "inhibition condition" and the above-mentioned predetermined period is referred to as an "inhibition period".

The HDD 19 previously stores the above-mentioned inhibition condition and inhibition period. The user previously inputs, through the operation device 15, the above inhibition condition and inhibition period. In this embodiment, in accordance with the contents input by the user, the controller 10 sets, as the inhibition condition, a condition that, among a character string constituting a fixed password, the number of characters identical to an entered password is equal to or greater than a predetermined ratio (in this case, 80%) to the total number of characters contained in the character string. Furthermore, the controller 10 sets one day as the inhibition period.

No particular limitation is placed on the above predetermined ratio so long as it is set at a value indicating that an entered password has high similarity to a fixed password. For example, the predetermined ratio may be "90%".

The facsimile communication device 20 performs connection to a public line and transfers image data to and from other facsimile devices via the public line.

The communication device 21 includes a communication module, such as a LAN (local area network) board. The image forming apparatus 1 performs data communications through the communication device 21 with the external devices 22, such as a personal computer on the network.

Each of the above devices of the image forming apparatus 1 is connected to a power supply and operates on electric power supplied from the power supply.

[Operations]

Figure 3:
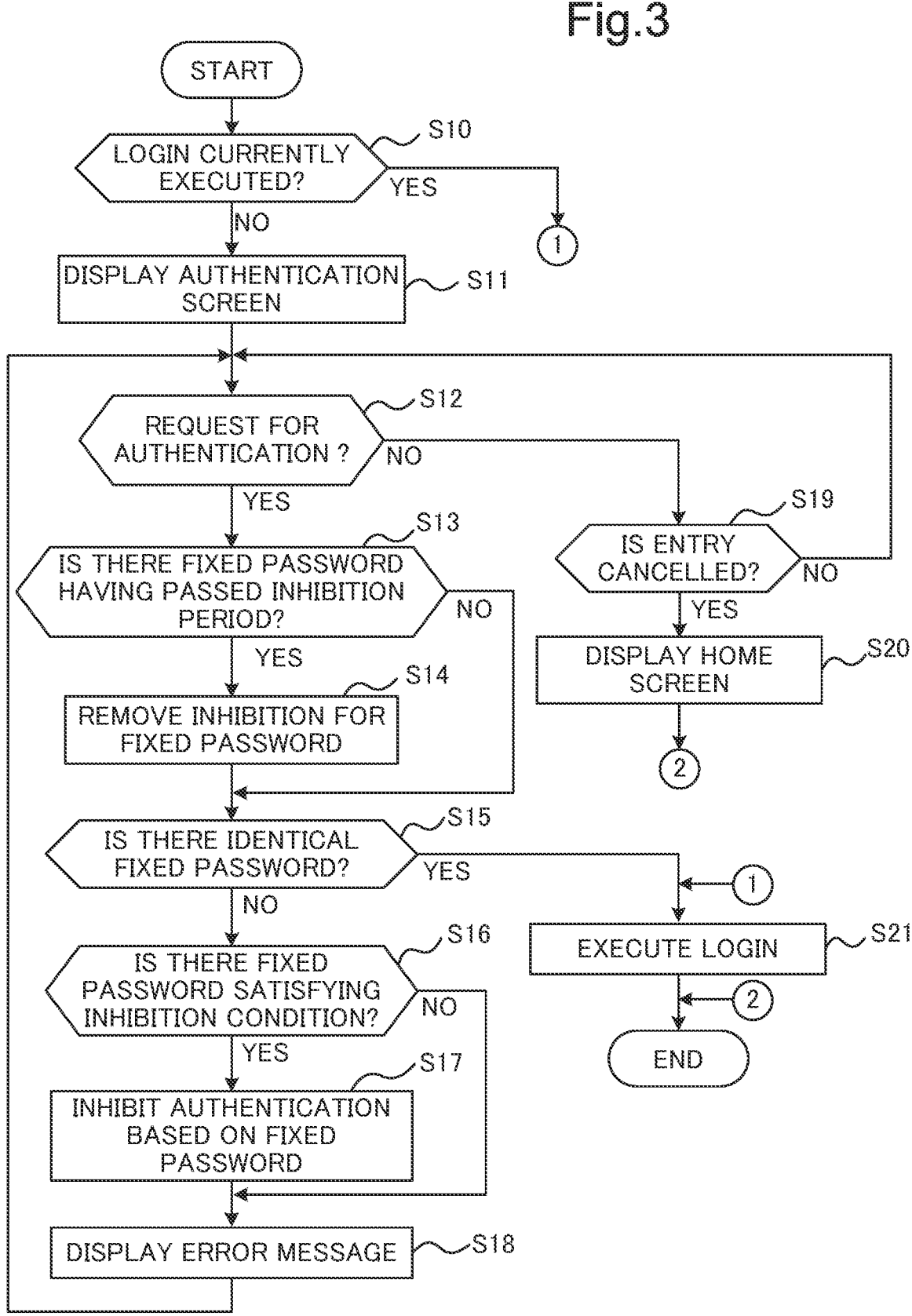
FIG. 3 is a flowchart showing first authentication processing.

A description will be given below of the control structure of the control program to be executed on the image forming apparatus 1 in order to execute the first authentication processing, together with an operation of the image forming apparatus 1. FIG. 3 is a flowchart showing the first authentication processing. The control program for executing the first authentication processing is executed by the user inputting, through the operation device 15, an instruction to select a copy function, a scan function or a facsimile function, which are the above-described predetermined functions of the image forming apparatus 1.

The user previously registers as authentication information a user name "0123" and two fixed passwords associated with the user name by entering them through the operation device 15. The above two passwords include a first fixed password composed of a character string "1K83J7YQ47" and a second fixed password composed of a character string "59FVP65BAG". The controller 10 allows the HDD 19 to store the registered authentication information.

Figure 4:
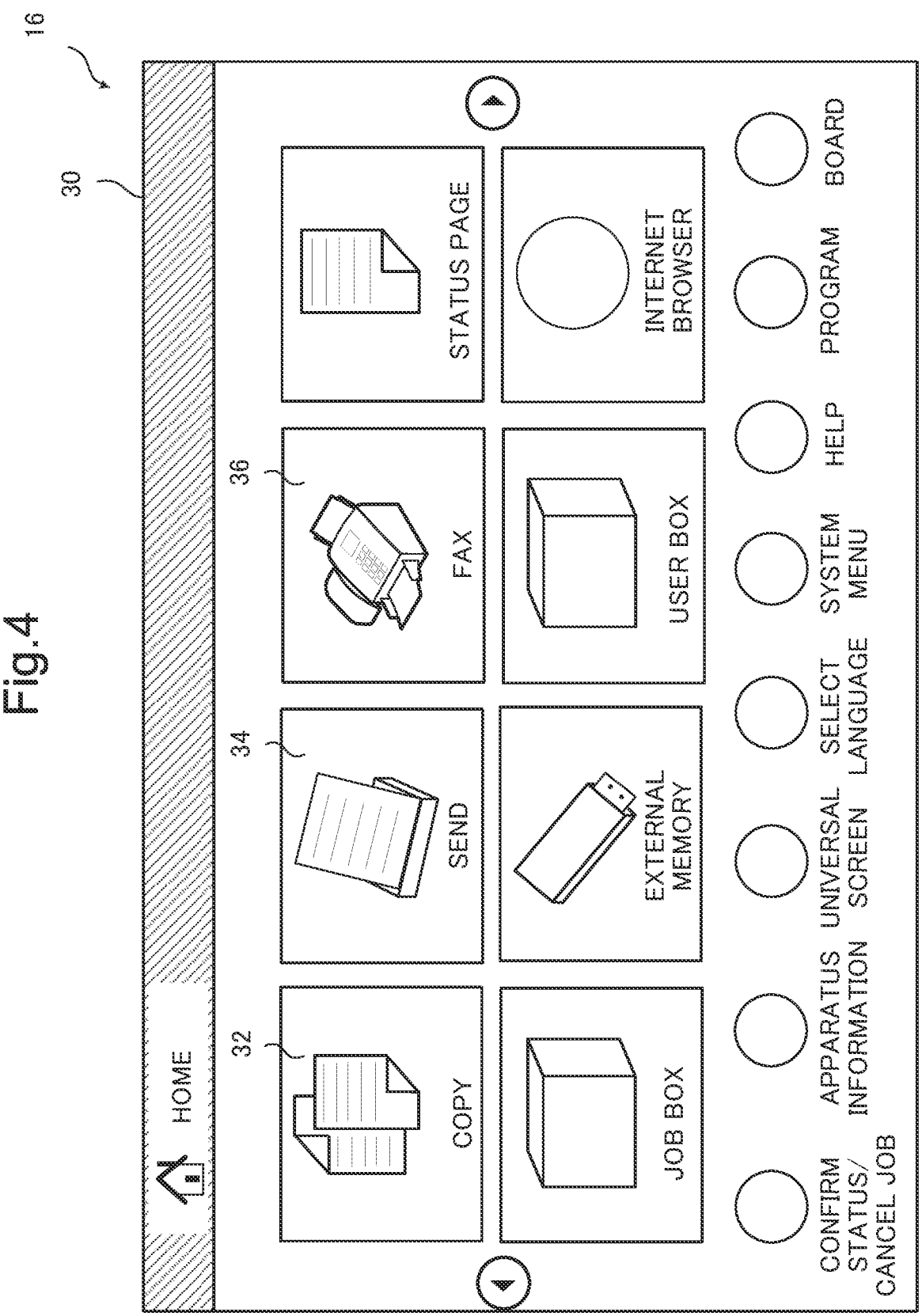
FIG. 4 is a view showing an example of a home screen.

When the image forming apparatus 1 is powered on, the controller 10 allows the display device 16 to display a home screen. FIG. 4 is a view showing an example of the home screen. Referring to FIG. 4, the home screen 30 is a screen for use in selecting one of a plurality of functions executable by the image forming apparatus 1. For example, the home screen 30 includes, as soft keys, a key 32 for selecting a copy function, a key 34 for selecting a scan function, a key 36 for selecting a facsimile function, and so on.

(1) Cases where Login is not Executed (1-1) Case where Password not Identical to any Registered Fixed Password is Entered Assume here that there is a third person who has acquired the user name "0123" and a portion "1K8*J7YQ47" of the first fixed password without legitimate authorization. The third person presses the key 32 with a desire to make an unauthorized use of the copy function. When the key 32 is pressed, the controller 10 determines whether or not login is currently executed (step S10). In this case, login has not been executed from the power-on until this point. Therefore, the controller 10 determines that login is currently not executed (NO in step S10), and allows the display device 16 to display an authentication screen through which a user name and a password are to be entered (step S11).

Figure 5:
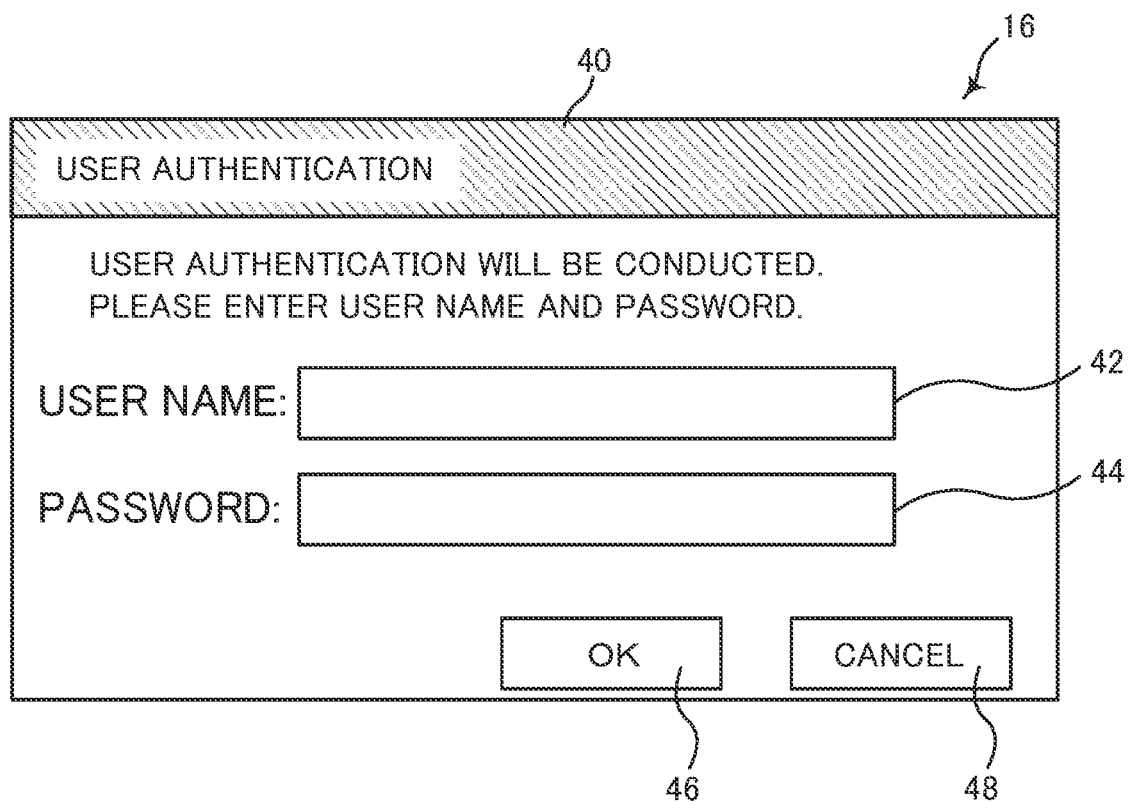
FIG. 5 is a view showing an example of an authentication screen.

FIG. 5 is a view showing an example of the authentication screen. Referring to FIG. 5, the authentication screen 40 contains: a field 42 into which a user name is to be entered; and a field 44 into which a password is to be entered. The authentication screen 40 further contains, as soft keys, a key 46 to which an instruction to make an authentication based on a user name and a password entered into the field 42 and the field 44, respectively, is to be input, and a key 48 to which an instruction to cancel the entry of a user name and a password is to be input. After the display of the authentication screen 40, the controller 10 waits for the acceptance of pressing of the key 46 or key 48 (NO in step S12 and NO in step S19).

The third person enters "0123" as a user name into the field 42 through the operation device 15. The third person further enters, as a password, a character string "1K84J7YQ47", in which a randomly selected number "4" is inserted into an uncertain portion of the acquired password represented by "*", into the field 44 and then presses the key 46. When the key 46 is pressed, the controller 10 determines that an instruction to make an authentication has been accepted (YES in step S12) and determines whether or not there is any fixed password for which the inhibition period has passed (step S13).

In this case, there is no fixed password based on which an authentication is inhibited from being made. Therefore, the controller 10 determines that there is no fixed password for which the inhibition period has passed (NO in step S13), and determines whether or not the entered password is identical to one of the plurality of fixed passwords previously stored on the HDD 19 (hereinafter, referred to simply as "registered") in association with the entered user name (step S15).

In this case, since neither the first fixed password nor the second fixed password is identical to the entered password, the controller 10 determines that the entered password is identical to none of the plurality of fixed passwords registered in association with the entered user name (NO in step S15), and determines whether or not any one of the plurality of fixed passwords registered in association with the entered user name satisfies the inhibition condition (step S16).

In this case, the first fixed password composed of a character string "1K83J7YQ47" contains "nine" characters identical to those contained in the entered password "1K84J7YQ47". The number of the identical characters accounts for 90% of "ten" which is a total number of characters contained in the character string constituting the first fixed password. Therefore, the controller 10 determines that one of the plurality of registered fixed passwords satisfies the inhibition condition (YES in step S16), makes a setting to inhibit an authentication based on the first fixed password satisfying the inhibition condition from being made for the inhibition period (in this case, one day) (step S17), and allows for the display of an error message prompting to re-enter a password on the authentication screen 40 (step S18).

Figure 6:
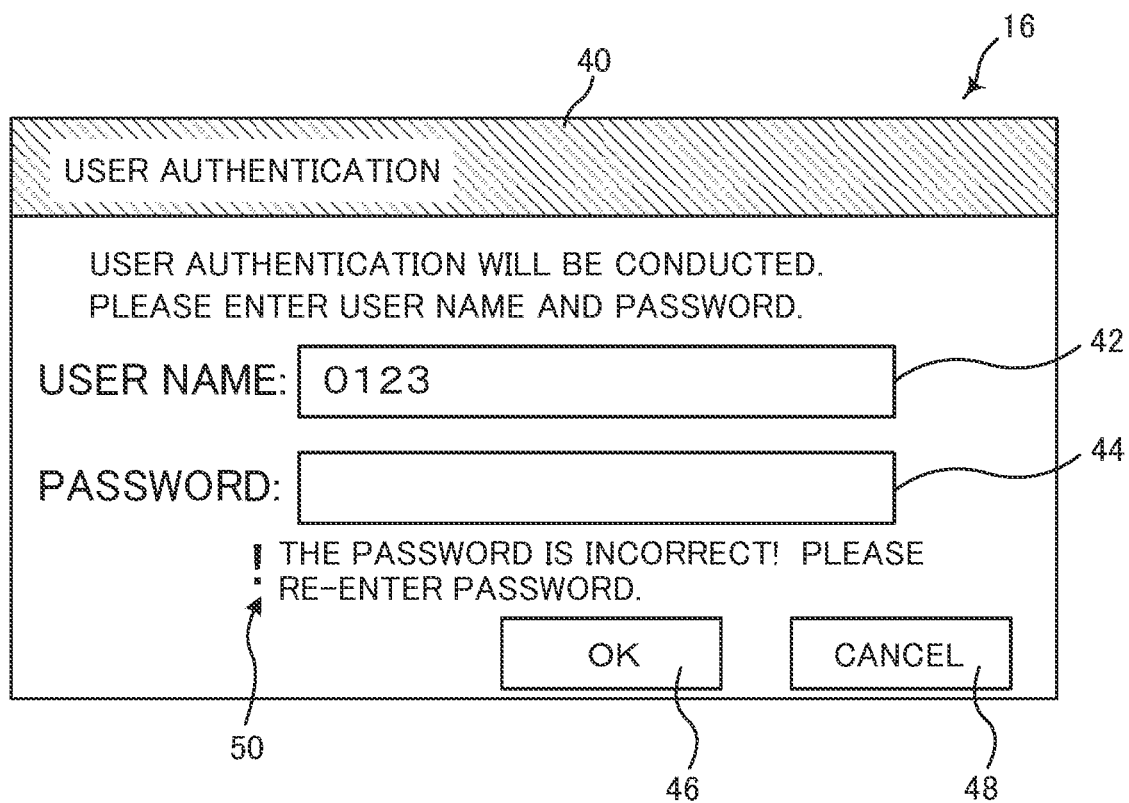
FIG. 6 is a view showing an example of an error message.

FIG. 6 is a view showing an example of the error message. Referring to FIG. 6, the controller 10 allows for the display of an error message 50 "THE PASSWORD IS INCORRECT! PLEASE RE-ENTER PASSWORD." near the field 44 on the authentication screen 40.

(1-2) Case where Password Identical to Fixed Password Authentication Based on which is Inhibited is Entered The third person confirms the error message 50, enters as a password a character string "1K83J7YQ47", in which a randomly selected number "3" is inserted into the uncertain portion of the acquired password represented by "*", into the field 44 through the operation device 15 and then presses the key 46. When the key 46 is pressed, the controller 10 determines that an instruction to make an authentication has been accepted (YES in step S12) and determines whether or not there is any fixed password for which the inhibition period has passed (step S13).

In this case, since the inhibition period for the first fixed password has not yet passed, the controller 10 determines that there is no fixed password for which the inhibition period has passed (NO in step S13), and determines whether or not the entered password is identical to one of the plurality of fixed passwords which are registered in association with the entered user name and for which there is no setting to inhibit an authentication from being made (step S15).

The password entered by the third person is identical to the first fixed password, but there is a setting to inhibit an authentication based on the first fixed password from being made. Therefore, the controller 10 determines that the entered password is identical to none of the plurality of fixed passwords which are registered in association with the entered user name and for which there is no setting to inhibit an authentication from being made (NO in step S15), determines that none of the plurality of fixed passwords registered in association with the entered user name satisfies the inhibition condition (NO in step S16), and allows for the display of the error message 50 on the authentication screen 40 (step S18).

The third person confirms the error message 50, abandons an attempt to make an unauthorized use of the copy function, and then presses the key 48 on the authentication screen 40. When the key 48 is pressed, the controller 10 determines that no instruction to make an authentication has been accepted (NO in step S12), determines that an instruction to cancel the entry of a user name and a password has been accepted (YES in step S19), and allows the display device 16 to display the home screen 30 (step S20).

(2) Cases where Login is Executed (2-1) Case where Password Identical to Fixed Password Authentication Base on which is not Inhibited is Entered After the attempt of the third person to operate the image forming apparatus 1 and before the elapse of the inhibition period for the first fixed password, a user presses the key 32 on the home screen 30 with a desire to use the copy function. When the key 32 is pressed, the controller 10 executes the processing tasks in steps S10 and S11 in the same manner as described above and allows the display device 16 to display the authentication screen 40.

The user enters, through the operation device 15, "0123" as a user name into the field 42 and the first fixed password as a password into the field 44 and then presses the key 46. When the key 46 is pressed, the controller 10 executes the processing tasks in steps S12, S13, S15, S16, and S18 in the same manner as described above.

The user confirms the error message 50, enters the second fixed password as a password into the field 44 through the operation device 15, and then presses the key 46. When the key 46 is pressed, the controller 10 executes the processing tasks in steps S12 and S13 in the same manner as described above.

The registered second fixed password is identical to the entered password. Therefore, the controller 10 determines that the entered password is identical to one of the plurality of fixed passwords which are registered in association with the entered user name and for which there is no setting to inhibit an authentication from being made (YES in step S15), executes login, and allows the display device 16 to display a setting screen through which various settings for the copy function are to be made, thus enabling the copy function (step S21).

(2-2) Case where Password Identical to Fixed Password Authentication Based on which has been Removed from Inhibition is Entered When the image forming apparatus 1 is powered on by a user on the day following the day on which the above attempt of the third person was made, the controller 10 allows the display device 16 to display the home screen 30. The user presses the key 32 on the home screen 30 with a desire to use the copy function. When the key 32 is pressed, the controller 10 determines whether or not login is currently executed (step S10). In this case, since login has not been executed from the power-on until this point, the controller 10 determines that login is currently not executed (NO in step S10), and allows the display device 16 to display the authentication screen 40 (step S11).

The user enters, through the operation device 15, "0123" as a user name into the field 42 and the first fixed password as a password into the field 44 and then presses the key 46. When the key 46 is pressed, the controller 10 determines that an instruction to make an authentication has been accepted (YES in step S12), and determines whether or not there is any fixed password for which the inhibition period has passed (step S13).

In this case, the inhibition period for the first fixed password has passed. Therefore, the controller 10 determines that there is a fixed password for which the inhibition period has passed (YES in step S13), and removes the setting that an authentication based on the first fixed password is inhibited from being made (step S14).

The first fixed password an authentication based on which has been removed from inhibition is identical to the entered password. Therefore, the controller 10 determines that the entered password is identical to one of the plurality of fixed passwords registered in association with the entered user name (YES in step S15), executes login, and allows the display device 16 to display a setting screen through which various settings for the copy function are to be made, thus enabling the copy function (step S21).

According to the above embodiment, when, upon entry of a user name and a password through the operation device 15, the entered password is identical to one of the plurality of fixed passwords registered in association with the entered user name, the controller 10 executes login. When the entered password is identical to none of the plurality of fixed passwords and any one of the plurality of fixed passwords satisfies the inhibition condition on similarity to the entered password, the controller 10 inhibits an authentication based on the fixed password satisfying the inhibition condition from being made for the inhibition period.

As seen from the above, the user can log in simply by entering a password identical to one of the plurality of fixed passwords previously registered. Therefore, it can be prevented that a situation occurs that the user has a plurality of passwords, but forgets just the password previously registered and thus fails to log in. Hence, the user is more likely to be permitted to log in as compared to the case where only one password is registered, which increases user convenience.

Furthermore, since the controller 10 inhibits an authentication from being made based on a fixed password satisfying the inhibition condition on similarity to the entered password, a decrease in safety due to an increased likelihood of permission for login can be prevented.

Moreover, according to the above embodiment, the controller 10 sets, as the inhibition condition, a condition that, among a character string constituting a fixed password, the number of characters identical to an entered password is equal to or greater than a predetermined ratio to the total number of characters contained in the character string.

Since, as thus far described, upon entry of a password similar to a registered fixed password, an authentication based on the fixed password is inhibited from being made, it can be prevented that, for example, a malicious third person having acquired a portion of a registered fixed password repeats entry of characters at random and is eventually executed to log in. Therefore, even when a plurality of fixed passwords are registered, high safety can be ensured.

Furthermore, according to the above embodiment, when the login is executed by the authentication device 2, the image forming device 12 and so on form an image on a recording paper sheet. Therefore, the user can easily acquire an image while high safety is ensured.

(First Modification)

The configuration of an image forming apparatus 1 containing an authentication device 2 according to a first modification of the present invention is the same as that in the above embodiment, except that second authentication processing is executed instead of the first authentication processing and information stored on the HDD 19 is partially different from that in the above embodiment. Hereinafter, a description will be given of different points compared to the above-described embodiment.

The HDD 19 stores a control program for executing the second authentication processing according to the first modification. When the processor operates in accordance with the control program, it executes, as the controller 10, the second authentication processing. Alternatively, the controller 10 may not be implemented by the operation in accordance with the computer program, but may be configured to be operable by a hardware circuit.

The HDD 19 stores, in association with each individual one of the plurality of fixed passwords previously stored as authentication information, the number of times the individual fixed password has satisfied the inhibition condition. Each time each individual fixed password satisfies the inhibition condition, the controller 10 updates the number of times the individual fixed password has satisfied the inhibition condition. Each time a setting is made to inhibit an authentication based on each individual fixed password from being made, the controller 10 resets the number of times the individual fixed password has satisfied the inhibition condition. However, the condition on which the above number of times is reset is not limited to the above condition. For example, the controller 10 may reset the above number of times each time the image forming apparatus 1 is powered on.

In the first modification, when the number of times the above inhibition condition has been satisfied reaches a predetermined number of times, the controller 10 inhibits an authentication based on the fixed password satisfying the inhibition condition from being made for the inhibition period. The HDD 19 previously stores the above-mentioned predetermined number of times. The controller 10 sets the predetermined number of times according to an instruction input through the operation device 15 by a user. No particular limitation is placed on the above predetermined number of times so long as it is such a number of times that any malicious third person cannot be executed to log in by repetitive entry of characters at random. However, the predetermined number of times is preferably small. In this modification, the following description is based on the assumption that "2" is set as the predetermined number of times.

[Operations]

Figure 7:
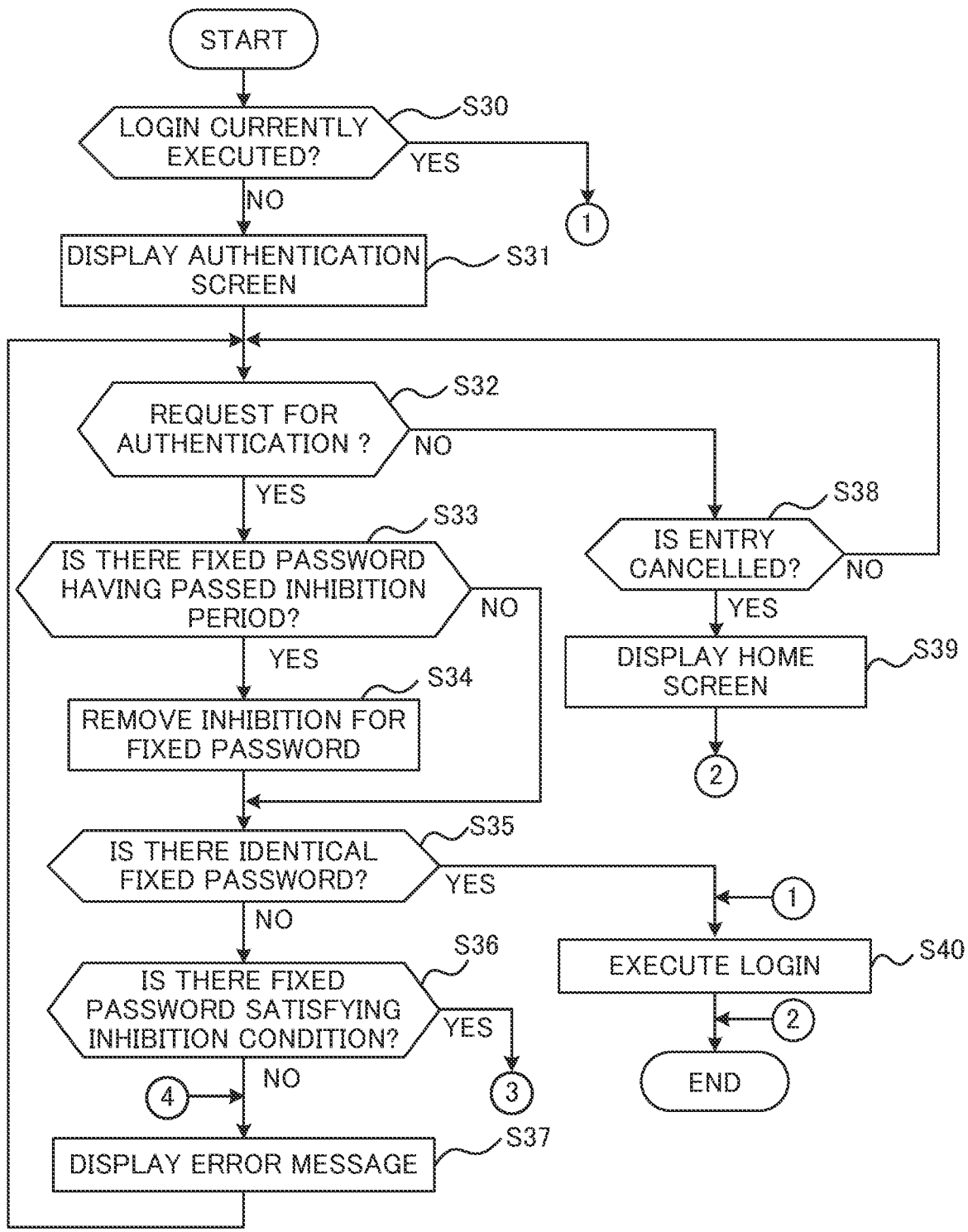
FIG. 7 is a flowchart showing second authentication processing.
Figure 8:
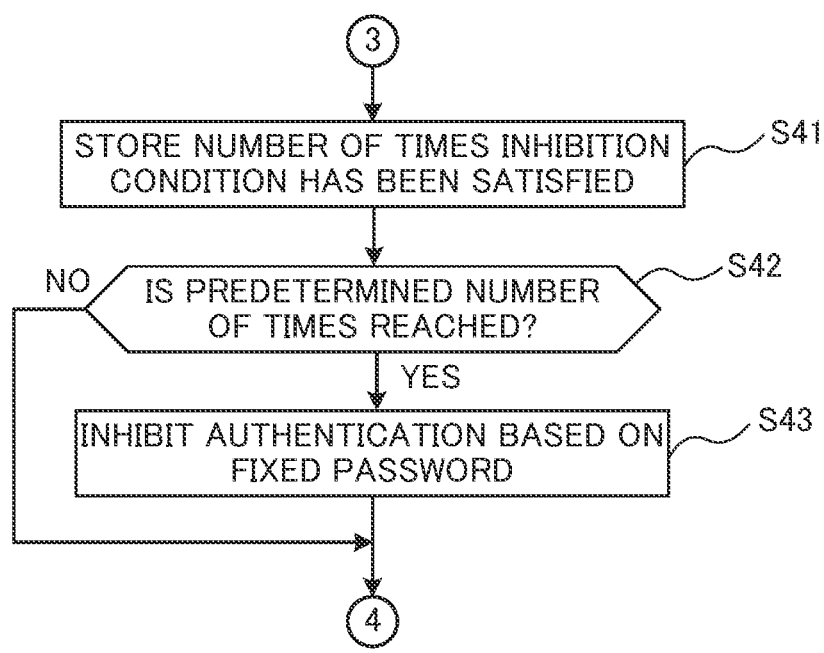
FIG. 8 is a flowchart showing the second authentication processing.

A description will be given below of the control structure of the control program to be executed on the image forming apparatus 1 in order to execute the second authentication processing, together with an operation of the image forming apparatus 1. FIGS. 7 and 8 are flowcharts showing the second authentication processing. In the control program for executing the second authentication processing, processing tasks in steps S30 to S40 are the same as those in steps S10 to S16 and steps S18 to S21. Hereinafter, different processing tasks compared to the first authentication processing will be mainly described.

The user previously registers as authentication information a user name "0123" and first and second fixed passwords associated with the user name by entering them through the operation device 15. The first fixed password is composed of a character string "1K83J7YQ47". The second fixed password is composed of a character string "59FVP65BAG". The controller 10 allows the HDD 19 to store the registered authentication information.

(1) Case where Number of Times Inhibition Condition has been Satisfied has not Reached Predetermined Number of Times When the image forming apparatus 1 is powered on, the controller 10 allows the display device 16 to display the home screen 30. The user presses the key 32 with a desire to use the copy function. When the key 32 is pressed, the controller 10 determines whether or not login is currently executed (step S30). In this case, login has not been executed from the power-on until this point. Therefore, the controller 10 determines that login is currently not executed (NO in step S30), and allows the display device 16 to display the authentication screen 40 (step S31).

The user enters "0123" as a user name into the field 42 through the operation device 15. The user further enters a character string "1K94J7YQ47" as a password. The entered character string is a character string in which a portion "83" of the first fixed password has been entered as "94" by an input error. After the entry of the password, the user presses the key 46.

When the key 46 is pressed, the controller 10 determines that an instruction to make an authentication has been accepted (YES in step S32) and determines whether or not there is any fixed password for which the inhibition period has passed (step S33).

In this case, there is no fixed password based on which an authentication is inhibited. Therefore, the controller 10 determines that there is no fixed password for which the inhibition period has passed (NO in step S33), and determines whether or not the entered password is identical to one of the plurality of fixed passwords registered in association with the entered user name (step S35).

In this case, since neither the first fixed password nor the second fixed password is identical to the entered password, the controller 10 determines that the entered password is identical to none of the plurality of fixed passwords registered in association with the entered user name (NO in step S35), and determines whether or not any one of the plurality of fixed passwords registered in association with the entered user name satisfies the inhibition condition (step S36).

In this case, the first fixed password composed of a character string "1K83J7YQ47" contains "eight" characters identical to those contained in the entered password "1K94J7YQ47". The number of the identical characters accounts for 80% of "ten" which is a total number of characters contained in the character string constituting the first fixed password. Therefore, the controller 10 determines that one of the plurality of registered fixed passwords satisfies the inhibition condition (YES in step S36), and allows the HDD 19 to store the number of times the first fixed password has satisfied the inhibition condition (step S41).

In this case, since the first fixed password has satisfied the inhibition condition for the first time, the controller 10 allows the HDD 19 to store "1" as the number of times the first fixed password has satisfied the inhibition condition, in association with the first fixed password previously stored on the HDD 19.

The controller 10 determines that the number of times the first fixed password has satisfied the inhibition condition has not reached "2" which is the predetermined number of times (NO in step S42), and allows the display device 16 to display the error message 50 (step S37).

(2) Case where Number of Times Inhibition Condition has been Satisfied has Reached Predetermined Number of Times The user confirms the error message 50 and enters a character string "1K93J7YQ47" as a password through the operation device 15. The entered character string is a character string in which a portion "8" of the first fixed password has been entered as "9" by an input error. After the entry of the password, the user presses the key 46. When the key 46 is pressed, the controller 10 executes the processing tasks in steps S32 to S35 in the same manner as described above.

In this case, the first fixed password composed of a character string "1K83J7YQ47" contains "nine" characters identical to those contained in the entered password "1K93J7YQ47". The number of the identical characters accounts for 90% of "ten" which is a total number of characters contained in the character string constituting the first fixed password. Therefore, the controller 10 determines that one of the plurality of registered fixed passwords satisfies the inhibition condition (YES in step S36), and allows the HDD 19 to store the number of times the first fixed password has satisfied the inhibition condition (step S41).

In this case, since the first fixed password has satisfied the inhibition condition for the second time, the controller 10 allows the HDD 19 to store "2" as the number of times the first fixed password has satisfied the inhibition condition, in association with the first fixed password previously stored on the HDD 19.

The controller 10 determines that the number of times the first fixed password has satisfied the inhibition condition has reached "2" which is the predetermined number of times (YES in step S42), makes a setting to inhibit an authentication based on the first fixed password satisfying the inhibition condition from being made for the inhibition period (in this case, one day) (step S43), and allows for the display of the error message 50 on the authentication screen 40 (step S37).

According to the first modification, each time any one of the plurality of fixed passwords satisfies the inhibition condition, the controller 10 allows the HDD 19 to store, in association with the fixed password satisfying the inhibition condition, the number of times the fixed password has satisfied the inhibition condition. Then, when the number of times the fixed password has satisfied the inhibition condition reaches a predetermined number of times, the controller 10 inhibits an authentication based on the fixed password satisfying the inhibition condition from being made for the inhibition period.

Thus, even if a legitimate user has entered a wrong password by a simple input error, it can be avoided that the making of an authentication based on a fixed password similar to the wrong password is immediately inhibited. This increases user convenience.

(Second Modification)

The configuration of an image forming apparatus 1 containing an authentication device 2 according to a second modification of the present invention is the same as that in the above embodiment, except that third authentication processing is executed instead of the first authentication processing and information stored on the HDD 19 is partially different from that in the above embodiment. Hereinafter, a description will be given of different points compared to the above-described embodiment.

The HDD 19 stores a control program for executing the third authentication processing according to the second modification. When the processor operates in accordance with the control program, it executes, as the controller 10, the third authentication processing. Alternatively, the controller 10 may not be implemented by the operation in accordance with the computer program, but may be configured to be operable by a hardware circuit.

The HDD 19 previously stores, as inhibition conditions, a first condition indicating that the similarity to an entered password is equal to or greater than a predetermined value, and a second condition indicating that the similarity to an entered password is equal to or greater than a second value lower than the first value. The controller 10 previously sets the first condition and the second condition according to instructions input through the operation device 15 by a user.

In this modification, the controller 10 sets, as the first condition, a condition that, among a character string constituting a fixed password, the number of characters identical to an entered password is equal to or greater than a predetermined ratio (in this case, "90%" as the first value) to the total number of characters contained in the character string. The controller 10 sets, as the second condition, a condition that, among a character string constituting a fixed password, the number of characters identical to an entered password is equal to or greater than a predetermined ratio (in this case, "70%" as the second value) to the total number of characters contained in the character string.

The HDD 19 stores information indicating a fixed password having most recently satisfied any inhibition condition (hereinafter, referred to as "most recent information"). Each time any fixed password satisfies any inhibition condition, the controller 10 updates the above-mentioned most recent information.

[Operations]

Figure 9:
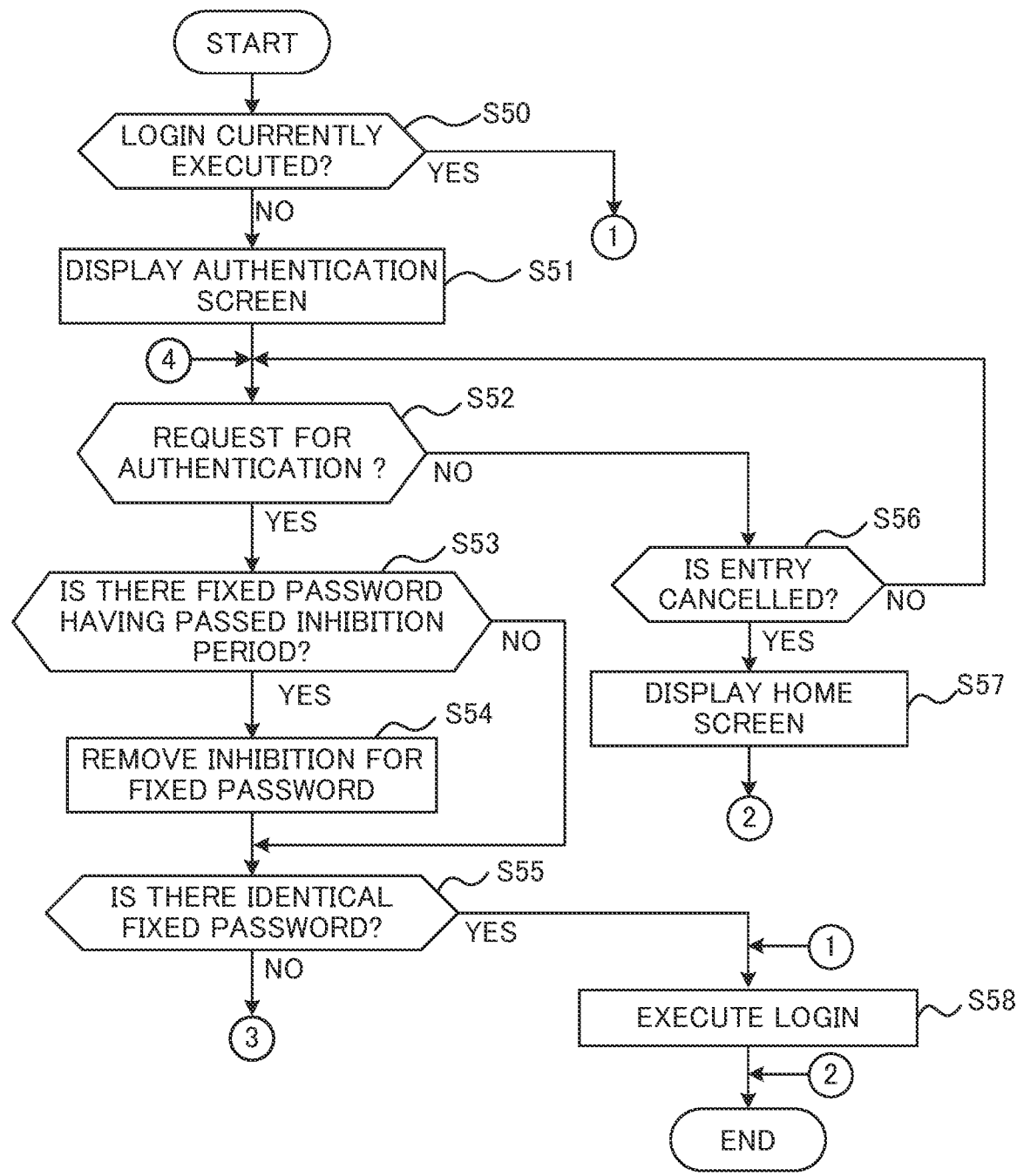
FIG. 9 is a flowchart showing third authentication processing.
Figure 10:
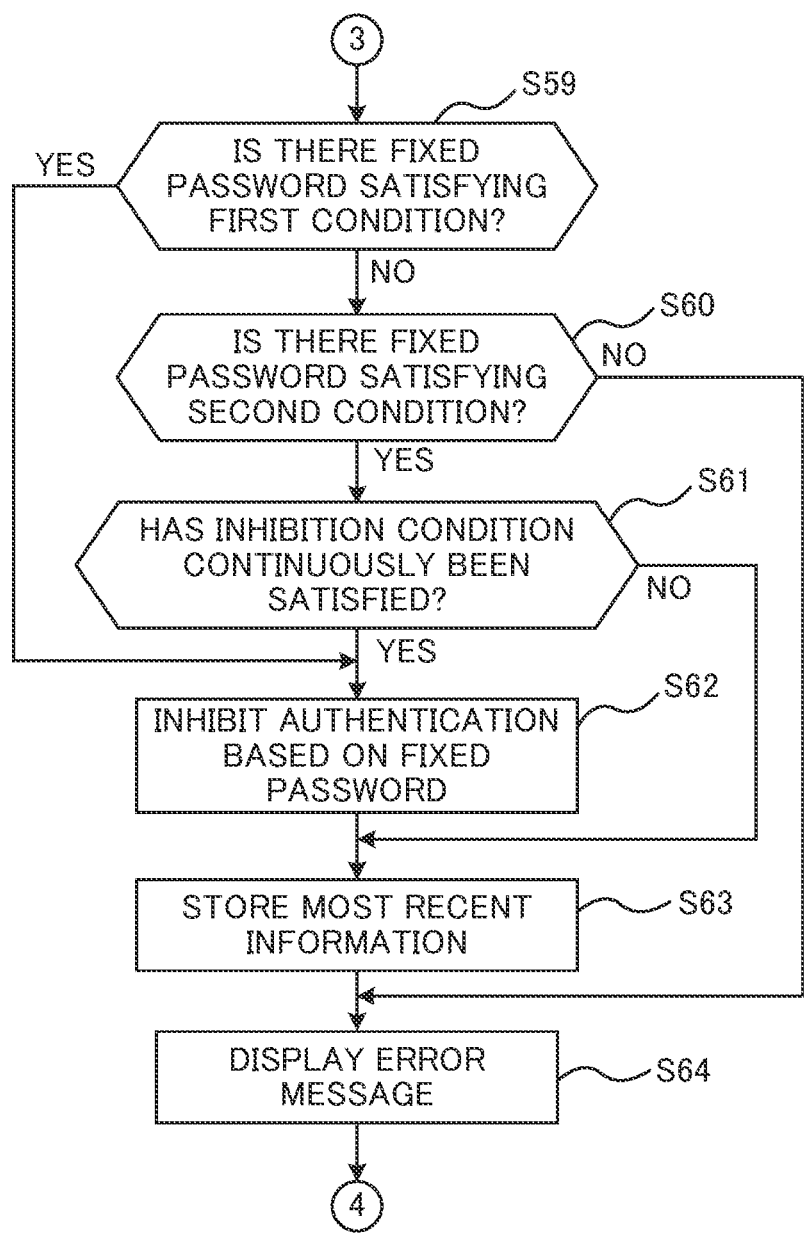
FIG. 10 is a flowchart showing the third authentication processing.

A description will be given below of the control structure of the control program to be executed on the image forming apparatus 1 in order to execute the third authentication processing, together with an operation of the image forming apparatus 1. FIGS. 9 and 10 are flowcharts showing the third authentication processing. In the control program for executing the third authentication processing, processing tasks in steps S50 to S58 are the same as those in steps S10 to S15 and steps S19 to S21. Hereinafter, different processing tasks compared to the first authentication processing will be mainly described.

The user previously registers as authentication information a user name "0123" and first and second fixed passwords associated with the user name by entering them through the operation device 15. The first fixed password is composed of a character string "1K83J7YQ47". The second fixed password is composed of a character string "59FVP65BAG". The controller 10 allows the HDD 19 to store the registered authentication information.

(1) Case where there is Fixed Password Satisfying First Condition

When the image forming apparatus is powered on, the controller 10 allows the display device 16 to display the home screen 30. Assume that there is a third person who has acquired the user name "0123" and a portion "1K8*J7YQ47" of the first fixed password without legitimate authorization. The third person presses the key 32 with a desire to make an unauthorized use of the copy function. When the key 32 is pressed, the controller 10 determines whether or not login is currently executed (step S50). In this case, login has not been executed from the power-on until this point. Therefore, the controller 10 determines that login is currently not executed (NO in step S50), and allows the display device 16 to display the authentication screen 40 (step S51).

The third person enters "0123" as a user name into the field 42 through the operation device 15. The third person further enters, as a password, a character string "1K82J7YQ47", in which a randomly selected number "2" is inserted into an uncertain portion of the acquired password represented by "*", into the field 44 and then presses the key 46.

When the key 46 is pressed, the controller 10 determines that an instruction to make an authentication has been accepted (YES in step S52), and determines whether or not there is any fixed password for which the inhibition period has passed (step S53).

In this case, there is no fixed password based on which an authentication is inhibited. Therefore, the controller 10 determines that there is no fixed password for which the inhibition period has passed (NO in step S53), and determines whether or not the entered password is identical to one of the plurality of fixed passwords registered in association with the entered user name (step S55).

In this case, since neither the first fixed password nor the second fixed password is identical to the entered password, the controller 10 determines that the entered password is identical to none of the plurality of fixed passwords registered in association with the entered user name (NO in step S55), and determines whether or not any one of the plurality of fixed passwords registered in association with the entered user name satisfies the first condition (step S59).

In this case, the first fixed password composed of a character string "1K83J7YQ47" contains "nine" characters identical to those contained in the entered password "1K82J7YQ47". The number of the identical characters accounts for 90% of "ten" which is a total number of characters contained in the character string constituting the first fixed password. Therefore, the controller 10 determines that one of the plurality of registered fixed passwords satisfies the first condition (YES in step S59), and makes a setting to inhibit an authentication based on the first fixed password satisfying the first condition from being made for the inhibition period (in this case, one day) (step S62).

After the setting to inhibit the making of an authentication, the controller 10 allows the HDD 19 to store most recent information indicating that the fixed password having most recently satisfied any inhibition condition is the first fixed password (step S63), and allows for the display of the error message 50 on the authentication screen 40 (step S64).

(1) Cases where there is Fixed Password Satisfying Second Condition (2-1) Case where the Fixed Password does not Continuously Satisfies Second Condition When the image forming apparatus is powered on, the controller 10 allows the display device 16 to display the home screen 30. Assume that there is a third person who has acquired the user name "0123" and a portion "59FV***BAG" of the second fixed password without legitimate authorization. The third person presses the key 32 with a desire to make an unauthorized use of the copy function. When the key 32 is pressed, the controller 10 executes the processing tasks in steps S50 and S51 in the same manner as described above.

The third person enters "0123" as a user name into the field 42 through the operation device 15. The third person further enters, as a password, a character string "59FVO54BAG", in which randomly selected characters "054" are inserted into uncertain portions of the acquired password represented by "***", into the field 44 and then presses the key 46.

When the key 46 is pressed, the controller 10 executes the processing tasks in steps S52, S53, and S55 in the same manner as described above. In this case, since neither the first fixed password nor the second fixed password is identical to the entered password, the controller 10 determines that the entered password is identical to none of the plurality of fixed passwords registered in association with the entered user name (NO in step S55).

The second fixed password composed of a character string "59FVP65BAG" contains "seven" characters identical to those contained in the entered password "59FVO54BAG". The number of the identical characters accounts for 70% of "ten" which is a total number of characters contained in the character string constituting the second fixed password.

Therefore, the controller 10 determines that none of the plurality of registered fixed passwords satisfies the first condition (NO in step S59), determines that one of the plurality of fixed passwords satisfies the second condition (YES in step S60), and determines whether or not the fixed password satisfying the second condition has continuously satisfied the inhibition condition (step S61).

In this case, since the fixed password having most recently satisfied any inhibition condition is the first fixed password, the controller 10 determines that the fixed password satisfying the second condition does not continuously satisfy the inhibition condition (NO in step S61), allows the HDD 19 to store most recent information indicating that the fixed password having most recently satisfied any inhibition condition is the second fixed password (step S63), and allows for the display of the error message 50 on the authentication screen 40 (step S64).

(2-2) Case where the Fixed Password Continuously Satisfies Second Condition

The third person confirms the error message 50, enters as a password a character string "59FVP54BAG", in which other randomly selected characters "P54" are inserted into uncertain portions of the acquired password represented by "***", into the field 44 through the operation device 15, and then presses the key 46.

When the key 46 is pressed, the controller 10 executes the processing tasks in steps S52, S53, and S55 in the same manner as described above. In this case, since neither the first fixed password nor the second fixed password is identical to the entered password, the controller 10 determines that the entered password is identical to none of the plurality of fixed passwords registered in association with the entered user name (NO in step S55).

The second fixed password composed of a character string "59FVP65BAG" contains "eight" characters identical to those contained in the entered password "59FVP54BAG". The number of the identical characters accounts for 80% of "ten" which is a total number of characters contained in the character string constituting the second fixed password.

Therefore, the controller 10 determines that none of the plurality of registered fixed passwords satisfies the first condition (NO in step S59), determines that one of the plurality of fixed passwords satisfies the second condition (YES in step S60), and determines whether or not the fixed password satisfying the second condition has continuously satisfied the inhibition condition (step S61).

In this case, since the fixed password having most recently satisfied any inhibition condition is the second fixed password, the controller 10 determines that the fixed password satisfying the second condition has continuously satisfied the inhibition condition (YES in step S61), and makes a setting to inhibit an authentication based on the second fixed password satisfying the second condition from being made for the inhibition period (in this case, one day) (step S62).

After the setting to inhibit the making of an authentication, the controller 10 allows the HDD 19 to store most recent information indicating that the fixed password having most recently satisfied any inhibition condition is the second fixed password (step S63), and allows for the display of the error message 50 on the authentication screen 40 (step S64).

According to the second modification, when any one of the plurality of fixed passwords satisfies the first condition, the controller 10 inhibits an authentication based on the fixed password satisfying the first condition from being made for the inhibition period. When any one of the plurality of fixed passwords continuously satisfies the second condition, the controller 10 inhibits an authentication based on the fixed password continuously satisfying the second condition from being made for the inhibition period. Furthermore, when any one of the plurality of fixed passwords satisfies the second condition, but the fixed password does not continuously satisfy the second condition, the controller 10 keeps from inhibiting an authentication based on the fixed password satisfying the second condition from being made.

As thus far described, if the similarity of an entered password to a fixed password is relatively high and it is highly likely that a malicious third person repeats random entry of passwords and may thus easily acquire a registered fixed password, the making of an authentication based on the password is immediately inhibited. On the other hand, if the similarity of an entered password to a fixed password is relatively low and it is less likely that a malicious third person repeats random entry of passwords and may thus easily acquire a registered fixed password, the making of an authentication based on the password is not immediately inhibited in consideration of the possibility of a legitimate user having entered a wrong password by a simple input error. Therefore, user convenience can be further increased.

(Other Modifications)

Although, in the above embodiment, the controller 10 sets, as an inhibition condition, a condition that, among a character string constituting a fixed password, the number of characters identical to an entered password is equal to or greater than a predetermined ratio to the total number of characters contained in the character string, the present invention is not limited to this embodiment.

The inhibition condition only has to be a condition according to which, when an entered password is similar to a fixed password, the making of an authentication based on the fixed password can be inhibited. For example, the controller 10 may set, as an inhibition condition, a condition that, among a character string constituting a fixed password, the sum of lengths of strings of characters identical to an entered password is equal to or greater than a predetermined ratio (for example, 80%) to the entire length of the character string constituting the fixed password.

For another example, the controller 10 may set, as an inhibition condition, a condition that, among a character string constituting a fixed password, the length of a longest string of characters identical to an entered password is equal to or greater than a predetermined ratio (for example, 80%) to the entire length of the character string constituting the fixed password.

Although in the above embodiment the user previously registers two fixed passwords, the present invention is not limited to this embodiment. The number of fixed password to be registered depends on the number of passwords owned by the user and is therefore not particularly limited. For example, the user may previously register ten fixed passwords.

Although in the above embodiment the controller 10 sets one day as an inhibition period, the present invention is not limited to this embodiment. For example, the controller 10 may set one week as an inhibition period. Alternatively, the controller 10 may set a plurality of inhibition periods depending on the number of fixed passwords previously registered.

For example, when the number of the plurality of fixed passwords previously registered is equal to or smaller than a predetermined number, the controller 10 may set the inhibition period to a period equal to or shorter than a predetermined time (for example, to three hours). When the number of the plurality of fixed passwords previously registered is greater than the predetermined number, the controller 10 may set the inhibition period to a period longer than the predetermined time (for example, to one day). With this configuration, it can be prevented that a situation occurs that, for example, a user having a small number of fixed passwords enters wrong passwords several times by simple input errors and thus fails to log in for a long time.

Although in the above embodiment a user name is cited as an example of user information for use in identifying a user, the present invention is not limited to this embodiment. The user information may be, for example, a user ID.

Although in the above embodiment the image forming device 12 forms an image on a recording paper sheet, the present invention is not limited to this embodiment. The image forming device 12 may form an image on any other type of recording medium, not only on a recording paper sheet. An example of another type of recording medium that can be cited is an OHP (overhead projector) sheet.

The present invention is not limited to the above embodiment and can be modified in various ways. For example, although in the above embodiments a multicolor multifunction peripheral is used as the image forming apparatus according to the present invention, this is merely illustrative and any other type of image forming apparatus may be used, such as a black-and-white multifunction peripheral, a printer, a copier or a facsimile machine.

The structures, configurations, and processing of the above embodiment described with reference to FIGS. 1 to 10 are merely embodiments of the present invention and not intended to limit the present invention to these structures, configurations, and processing.

The invention claimed is:

1. An authentication device comprising:
   a storage device that previously stores user information for identifying a user and a plurality of fixed passwords in association between the user information and the plurality of fixed passwords;

an input device for use in entering user information and a password; and a controller that executes login when user information and a password are entered through the input device and the entered password is identical to one of the plurality of fixed passwords previously stored in association with the entered user information in the storage device, wherein when the entered password is identical to none of the plurality of fixed passwords previously stored in association with the entered user information in the storage device and any one of the plurality of fixed passwords satisfies a predetermined condition on similarity to the entered password, the controller inhibits an authentication based on the fixed password satisfying the predetermined condition from being made for a predetermined period, wherein the controller sets, as the predetermined conditions, a first condition indicating that similarity to the entered password is equal to or greater than a predetermined first value, and a second condition indicating that the similarity to the entered password is equal to or greater than a second value lower than the first value, the controller allows the storage device to store information indicating a fixed password having most recently satisfied the predetermined condition, when any one of the plurality of fixed passwords satisfies the first condition, the controller inhibits an authentication based on the fixed password satisfying the first condition from being made for the predetermined period, and when any one of the plurality of fixed passwords continuously satisfies the second condition, the controller inhibits an authentication based on the fixed password continuously satisfying the second condition from being made for the predetermined period.

2. The authentication device according to claim 1, wherein when any one of the plurality of fixed passwords satisfies the second condition, but the fixed password does not continuously satisfy the second condition, the controller keeps from inhibiting an authentication based on the fixed password satisfying the second condition from being made.

3. An authentication device comprising:

a storage device that previously stores user information for identifying a user and a plurality of fixed passwords in association between the user information and the plurality of fixed passwords;

an input device for use in entering user information and a password; and a controller that executes login when user information and a password are entered through the input device and the entered password is identical to one of the plurality of fixed passwords previously stored in association with the entered user information in the storage device, wherein when the entered password is identical to none of the plurality of fixed passwords previously stored in association with the entered user information in the storage device and any one of the plurality of fixed passwords satisfies a predetermined condition on similarity to the entered password, the controller inhibits an authentication based on the fixed password satisfying the predetermined condition from being made for a predetermined period, wherein when a number of the plurality of fixed passwords previously stored in the storage device is equal to or smaller than a predetermined number, the controller sets the predetermined period to a period equal to or shorter than a predetermined time, and wherein when the number of the plurality of fixed passwords is greater than the predetermined number, the controller sets the predetermined period to a period longer than the predetermined time.

* * * * *